June 17, 1969  L. H. JOICHI  3,449,986
AUTOMATIC TOOL RESETTING APPARATUS
Filed Sept. 30, 1966
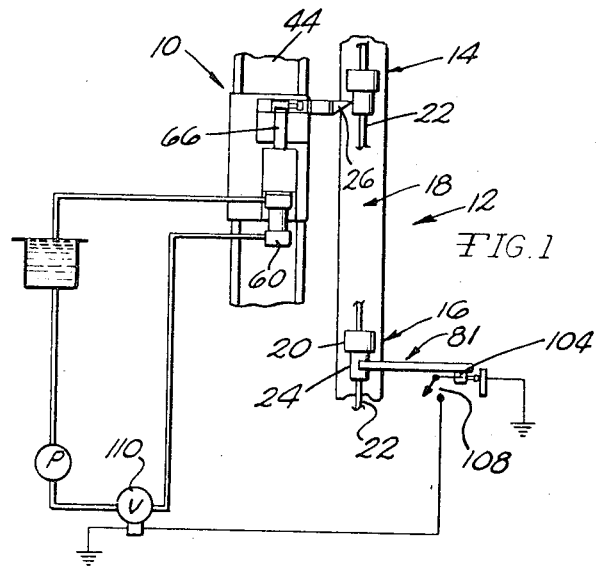
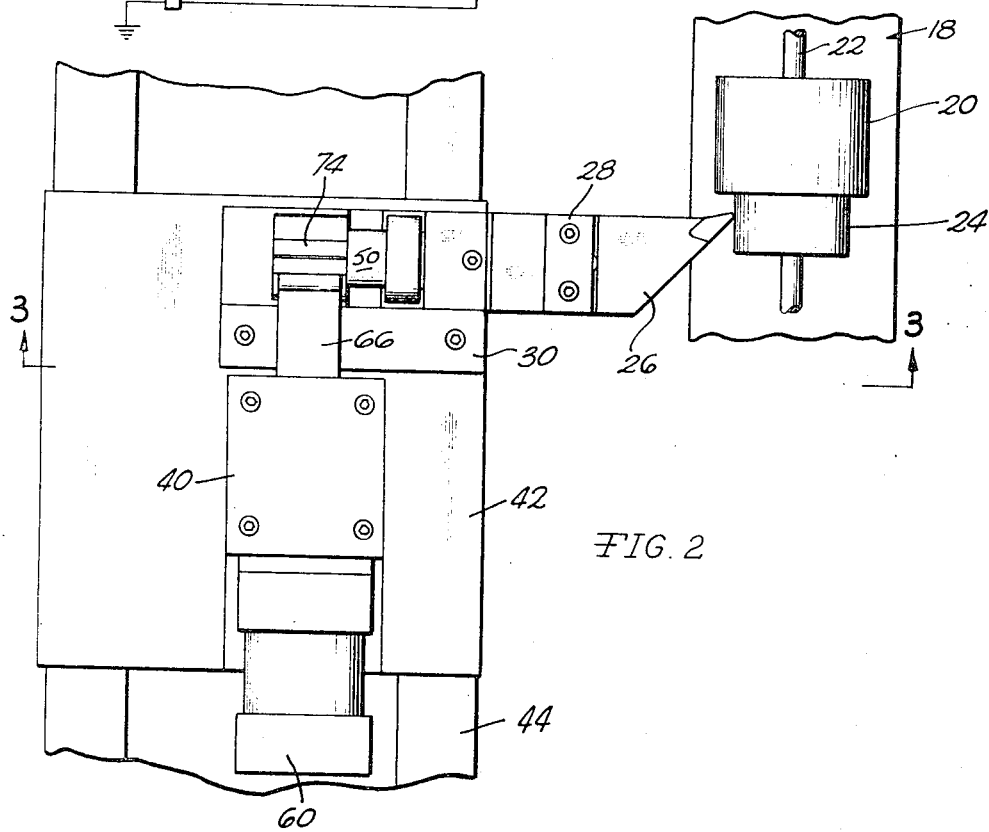
INVENTOR
LLOYD H. JOICHI
BY Olsen and Stephenson
ATTORNEYS

INVENTOR
LLOYD H. JOICHI

United States Patent Office 3,449,986
Patented June 17, 1969

3,449,986
AUTOMATIC TOOL RESETTING APPARATUS
Lloyd H. Joichi, Warren, Mich., assignor to La Salle Machine Tool, Inc., Warren, Mich., a corporation of Michigan
Filed Sept. 30, 1966, Ser. No. 583,189
Int. Cl. B23b 3/00
U.S. Cl. 82—2
5 Claims

ABSTRACT OF THE DISCLOSURE

Apparatus for incrementally moving a machine tool so as to compensate for tool wear and thereby maintain workpieces machined thereby of a predetermined outer diameter. The apparatus includes a tool support which has a fixed section and a section deflectable relative to the fixed section, the tool being mounted on the deflectable section. An incrementally moving member which is mounted on the fixed section and engaged with the deflectable section is operable to deflect the deflectable section so as to move the tool in a direction to compensate for tool wear.

---

This invention relates generally to machine tool apparatus and more particularly to improved apparatus for continually resetting a machine tool to compensate for tool wear so as to automatically maintain a predetermined outer diameter on workpieces.

Continual wear of a machine tool, such as a cutting or turning tool, is unavoidable where a machine is set to continuously machine like parts to a predetermined outer diameter. The practice in the past has been to manually measure, at periodic intervals, workpieces turned by the tool apparatus. When a workpiece was oversize, more than the allowed tolerance, the machine was shut down and the position of the tool was manually adjusted to bring subsequently machined parts within the required tolerances. One or more trial cuts were made with the tool, and additional tool adjustments and trial cuts were made where necessary. This procedure inevitably resulted in considerable machine "down time" which is objectionable from a standpoint of economy and machine production. Automatic adjustment of the tool to compensate for wear is therefore desirable to reduce or eliminate machine "down time" and provide for automatic dimensional control of workpieces. It is an object of this invention, therefore, to provide improved apparatus for automatically gauging workpieces and automatically resetting the tools to compensate for tool wear in response to a signal from the gauging apparatus.

In the improved apparatus of this invention, the tool is mounted on a support which is partially split so that it has a fixed section and a section which can be deflected relative to the fixed section. The tool is mounted on the deflectable section so that it can be moved very small distances in a direction to adjust the tool position to compensate for wear. An actuating rod on the fixed body section is also movable in very small increments in the same direction and engages the deflectable section so as to flex it and thus move the tool. A cylinder and ratchet assembly is provided for moving the actuating rod in response to a signal transmitted to the control for the cylinder. This signal is generated by a transducer associated with the gauging apparatus which continuously measures the workpieces which have been turned by the tool. When the gauging apparatus senses a workpiece which is oversize by at least a predetermined amount, the transducer signals the cylinder control so that the cylinder moves the rod in a direction to reset the tool to compensate for the wear which resulted in the oversize part.

A further object of this invention, therefore, is to provide improved automatic machine tool resetting apparatus which can be economically incorporated in an automated machine tool assembly and is reliable in operation to insure continuous tool adjustment to compensate for tool wear.

Further objects, features and advantages of this invention will become apparent from a consideration of the following description, the appended claims, and the accompanying drawing in which:

FIGURE 1 is a diagrammatic view of a machine tool assembly, showing a machining station and a gauging station therein, and showing the automatic tool resetting apparatus of this invention in assembly relation therewith;

FIGURE 2 is an enlarged fragmentary plan view of the machining station in the apparatus shown in FIG. 1;

Figure 3:
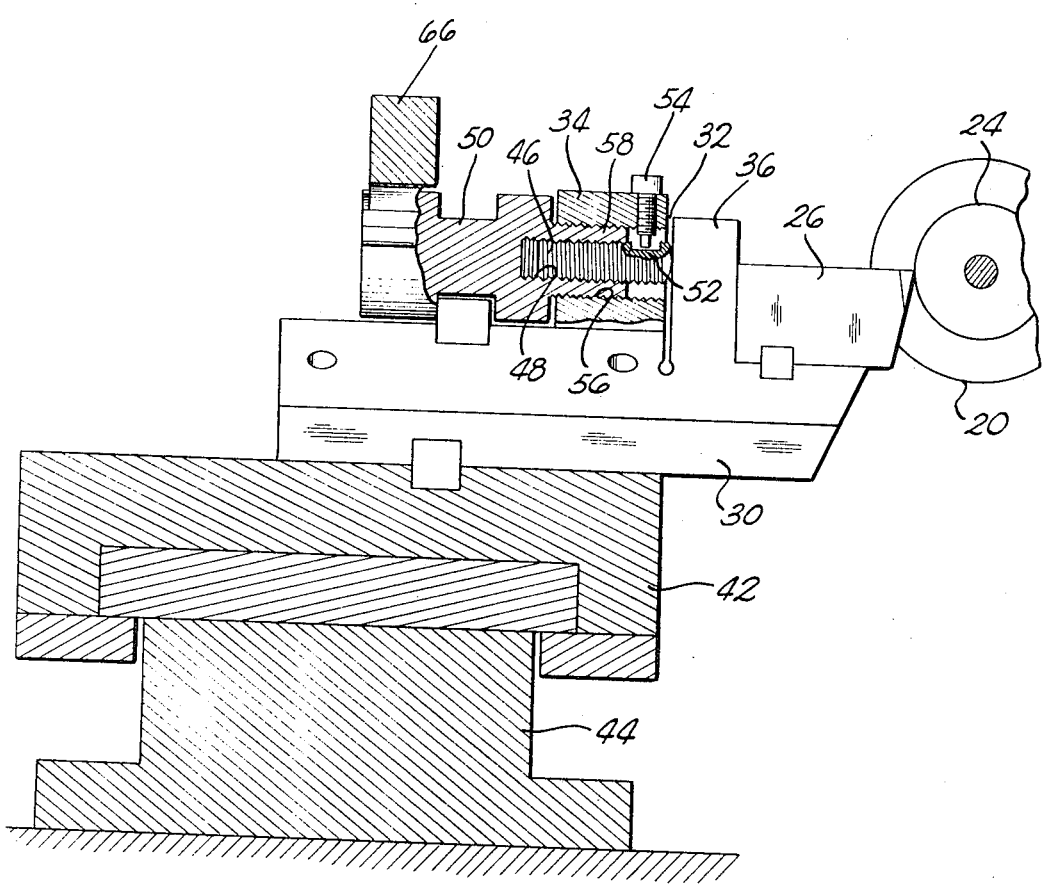
FIGURE 3 is a transverse sectional view of the machining station structure as seen from substantially the line 3—3 in FIG. 2.

With reference to the drawing, the automatic tool resetting apparatus of this invention, indicated generally at 10, is illustrated diagrammatically in FIG. 1 in assembly relation with an automated machine tool assembly 12 which includes a machining station 14, a gauging station 16, and a conveyor or transfer assembly 18 capable of transferring workpieces 20 from the machining station 14 to the gauging station 16. Means, indicated diagrammatically at 22, is provided for supporting the workpieces 20 and for rotating workpieces 20 at the machining station 14. In the illustrated unit 12, the cylindrical surface 24 (FIG. 2) of the workpiece 20 is to be turned to a diameter within preselected tolerances. This turning is accomplished by a turning tool 26 which is mounted, such as by bolts 28, on a support member, indicated generally at 30. As best appears in FIG. 3, the support 30 is formed with a vertically extending slot 32 which splits the support 30 into two connected sections, namely, a fixed section 34 and a section 36 which is deflectable relative to the fixed section 34 by virtue of the slot 32. The fixed section 34 is secured to a slide 42 that is in turn slidably supported on a base 44 so that the tool 26 can be moved, by any suitable means which is not illustrated, in a direction axially of the workpiece 20 as to remove material from the workpiece surface 24.

A threaded actuating rod 46 is mounted in an internally threaded opening 48 in a spindle 50 rotatably mounted on the support 30. The actuating rod 46 extends across the slot 32 and engages the deflectable section 36 of the support 30, and is formed on one side with a slot 52 which extends axially of the rod 46 and in which a pin 54 is positioned to prevent rotation of the rod 46. The fixed section 34 of the support 30 is also provided with a threaded opening 56 in which a threaded portion 58 of the spindle 50 is mounted. The threaded openings 48 and 56 are threaded in the same directions, but the threads have different leads. In other words, in one embodiment of the invention the opening 56 is formed with a right-hand thread having fifty threads to the inch, and the opening 48 is a left-hand thread having forty threads to the inch. Consequently, if the spindle 50 is rotated in a direction to retract it relative to the threaded opening 56, the actuating rod 46 is moved, relative to the spindle 50, in a forward direction. Since the lead on the threads on the actuating rod 46 is greater than the lead on the threads on the portion 58 of the spindle 50, the net result of this rotation of the spindle 50 is a movement of the actuating rod 46 a very small distance in a direction to advance the tool 26 relative to the workpiece surface 24. This small movement is a differential movement proportional to the difference in the leads on the threads in the openings 48 and 56. This structure thus enables small incremental adjustments of tool 26 toward workpiece surface 24 in response to actuating movements which are large enough to be practical. The net result is precision adjustment of tool 26 within required tolerances. The same result can be obtained by forming the opening 56 with forty threads to the inch and forming the opening 48 with fifty threads to the inch, and rotating the spindle 50 in a direction to advance it into opening 56. Then as spindle portion 58 is moved forwardly, rod 46 is retracted but since the longer thread lead is in opening 56, the net result will be an incremental advance of rod 46 to move tool 26 toward the work.

Figure 4:
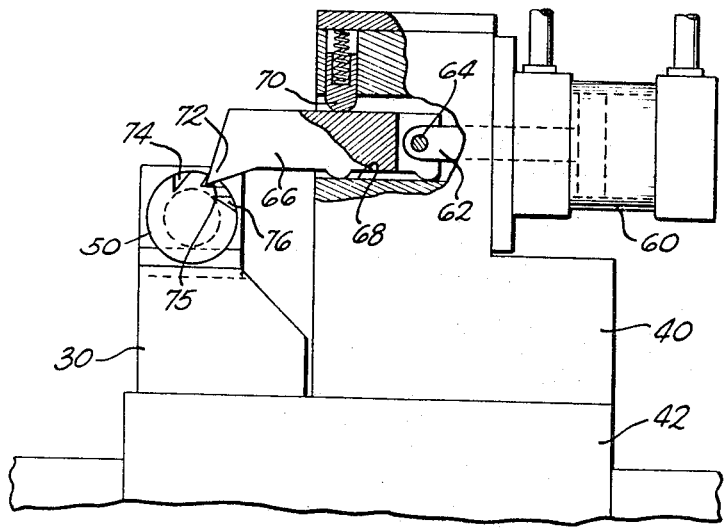
FIGURE 4 is a rear elevational view of the machining station structure illustrated in FIGS. 2 and 3, with some parts broken away and other parts shown in section for the purpose of clarity.
Figure 5:
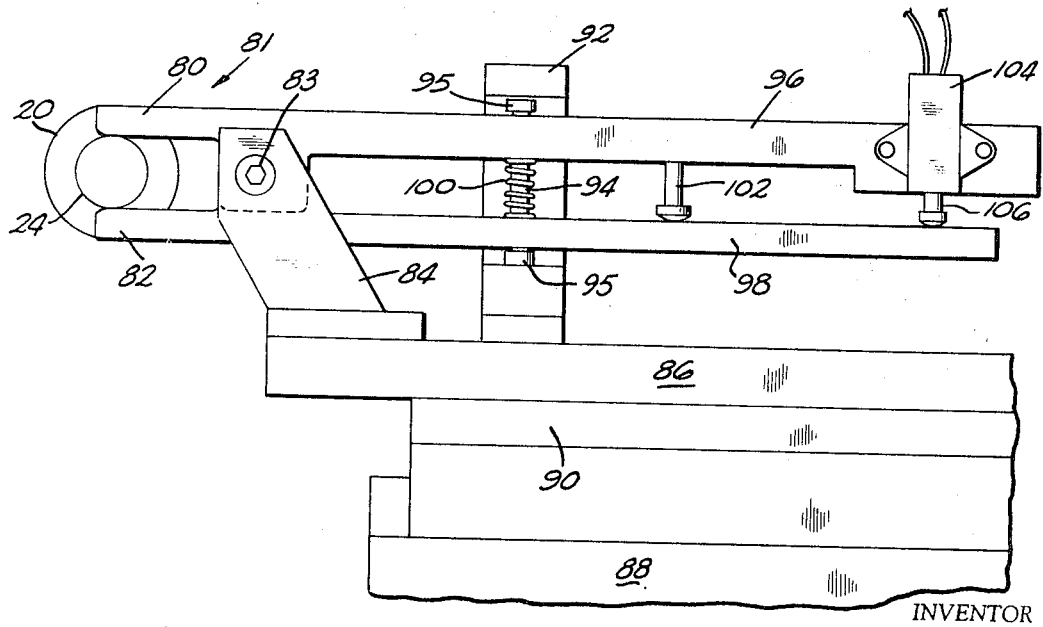
FIGURE 5 is an elevational view of the gauging station structure in the apparatus of this invention.

The spindle 50 is rotated by a fluid actuated cylinder assembly 60 (FIGS. 2 and 4) which is provided with a piston rod 62 and is mounted on a body 40 attached to slide 42. The piston rod 62 is connected, such as by a pin 64, to a dog 66 which is slidably mounted in an opening 68 in the body 40. A spring pressed pin 70 urges the dog 66 in a downward direction against the bottom side of opening 68 during movement of dog 66 out of opening 68, but pin 70 is retractable against the spring pressure to allow the dog 66 to pivot upwardly about pin 64 for a purpose to appear presently. A tooth 72 on the terminal end of the dog 66 is engageable in notches 74, 75, and 76 on the periphery of the spindle 50 for rotating the spindle in a counterclockwise direction as viewed in FIG. 4. The notches 74, 75 and 76 are shaped so that when the dog 66 is retracted, it will pivot upwardly out of a notch 74, for example, and ride on the periphery of spindle 50 during retracting movement into opening 68 to the position illustrated in FIG. 4 in which the tooth 72 will be urged downwardly into the next notch 75 by the spring pressed pin 70.

In the illustrated embodiment of the invention, the spindle 50 is provided with three notches, and the spindle 50, the actuating rod 46, and the turning tool 26 are initially adjusted to provide for turning of the workpiece 20 to the desired outer diameter at the surface 24 when the dog 72 is in the notch 74. When the dog 72 has rotated the spindle 50 to a position in which the dog is positioned in the notch 76, subsequent resettings of the tool 26 are accomplished manually, and in each case the dog 72 is reset in the notch 74. The number and spacing of the notches is variable to suit each installation of apparatus 10.

It can thus be seen that in the illustrated embodiment of the invention, the cylinder assembly 60 is operable to automatically advance the actuating rod 46 small distances toward the workpiece surface 24. Each such movement results in deflection of the section 36 of the support 30 on which the tool 26 is mounted. As a result, the position of the tool 26 is adjusted each time the cylinder assembly 60 is actuated to compensate for tool wear.

The gauging station 16 includes a gauging assembly that consists of a pair of fingers 80 and 82 which are engageable with diametrically opposite sides of the workpiece surface 24. The fingers 80 and 82 are pivotally mounted on a pin 83 attached to a support arm 84 carried on a slide 86 which is supported on a base 88 for movement in the direction of the arrow 90 to move the fingers 80 and 82 toward and away from a workpiece 24 at the gauging station 16. A column 92 on the slide 86 carries a pin 94 which extends through integral extensions 96 and 98 on the fingers 80 and 82, respectively. A compression spring 100 on the pin 94 engages the finger extensions 96 and 98 and urges them away from each other to thereby urge the fingers 80 and 82 toward each other. A stop pin 102 carried by the extension 96 is engageable with the extension 98 to limit movement of the extensions toward each other, and heads 95 on the pin 94 are engageable with the extensions to limit movement of the extensions away from each other. A transducer 104 carried by the extension 96 has a spring pressed actuating plunger 106 which is engaged by the extension 98. The transducer 104 includes a switch 108, indicated diagrammatically in FIG. 1, which is closed when the plunger 106 is actuated by movement of extension 98 a predetermined distance toward the extension 96 by engagement of the fingers 80 and 82 with a workpiece 20 which is oversize at the surface 24. Closing of the switch 108 provides for the closing of a circuit through a valve 110, such as a solenoid actuated valve, which in turn provides for actuation of the cylinder assembly 60 to advance the piston rod 62. Advance of the piston rod 62 results in rotation of the spindle 50 through an angle which is of a magnitude determined by the spacing of notches 74, 75 and 76 to adjust the position of the turning tool 26 to compensate for tool wear. The stop 102 functions to prevent overactuation of the plunger 106 which would damage the transducer 104. It is to be understood that any suitable transducer 104 can be associated with the cylinder assembly 60 to provide for actuation of the cylinder assembly 60 in response to a signal from the transducer 104 that a workpiece 20 is oversize.

In operation of the apparatus 10, the tool 26 at the machining station 14 operates continuously to machine workpieces 20 as they are brought into position at the station 14 by transfer assembly 18. The machined workpieces 20 are subsequently transferred by the transfer assembly 18 to the gauging station 16. The gauging apparatus 81 has its slide 86 advanced toward each workpiece 20 as it is brought into position at the station 16. The fingers 80 and 82 engage the surface 24 to gauge the diameter thereof, and the slide 86 is then retracted. When the tool 26 has worn to an extent such that the parts 20 are oversize, the fingers 80 and 82 will be moved on the subsequent gauging step to actuate the transducer 104 which then signals the cylinder assembly 60 to provide for rotation of the spindle 50. Rotation of the spindle 50 provides for an incremental deflection of the tool support section 36 to move the tool 26 toward the workpiece and compensate for tool wear. This process is continuous and eliminates the need for manual adjustment of the tool 26. By placing the proper number of notches 74 in the spindle 50 to correspond with the capacity of the machine unit 12 and the length of the work shift time, the apparatus 10 can be adjusted such that it is necessary to manually reset the tool 26 and the spindle 50 only between shifts. This eliminates machine down time during work shifts. The mounting of the tool 26 on the deflectable support section 36 provides a firm tool support which is adjustable in the small amounts necessary to compensate for tool wear and which will also maintain the tool in an adjusted position. The actuating rod 46 cooperates with the deflectable tool support section 36 to provide the necessary small movements of the section 36.

It will be understood that the automatic tool resetting appartus which is herein disclosed and described is presented for purposes of explanation and illustration and is not intended to indicate limits of the invention, the scope of which is defined by the following claims.

What is claimed is:

1. Apparatus for maintaining a machine tool in a position to continually machine workpieces to a predetermined outer diameter, said apparatus comprising a machining station, a machine tool at said station, a tool support formed with a slot which divides said support into a fixed section and a section deflectable relative to said fixed section, means mounting said tool on said deflectable section for adjustable movement in a direction to compensate for wear of said tool, means on said fixed section engaged with said deflectable section for deflecting said deflectable section so as to move said tool in said direction in predetermined increments of travel, a subsequent gauging station, means at said gauging station for gauging the outer diameter of workpieces turned at said machining station, and means responsive in operation to an indication from said gauging means that a workpiece outer diameter is oversize by a predetermined amount for signalling said tool deflecting means to provide for deflection of said deflectable section so as to move said tool in said direction said predetermined increment of travel.

2. Apparatus according to claim 1 in which said tool moving means includes a threaded rod mounted on said fixed section and extended across said slot into engagement with said deflectable section, and means for incrementally advancing said rod in a direction across said slot so as to deflect said deflectable section.

3. Apparatus according to claim 2 in which said means for advancing said rod comprises a rotatable spindle having a threaded portion threaded into an opining in said fixed section, said opening being formed with threads having a predetermined lead, said threaded rod being threaded into an opening in said threaded spindle portion and being restrained against rotation relative to said one section, said opening in said spindle portion being formed with threads having a lead different from said predetermined lead, whereby on rotation of said spindle through a predetermined angle axial movement of said rod is obtained which is proportional to the difference in said thread leads.

4. Apparatus according to claim 3 further including ratchet means for rotating said spindle through said predetermined angle, and motor means at said machining station for moving said ratchet means.

5. Apparatus according to claim 4 in which said gauging means includes a pair of fingers, means for moving said fingers into positions engaged with diametrically opposite sides of a workpiece, and means actuated in response to movement of said fingers a predetermined distance apart for actuating said motor means.

References Cited
UNITED STATES PATENTS 3,010,348   11/1961   Swanson et al. _____ 82—2.5

LEONIDAS VLACHOS, *Primary Examiner.*